UNITED STATES PATENT OFFICE.

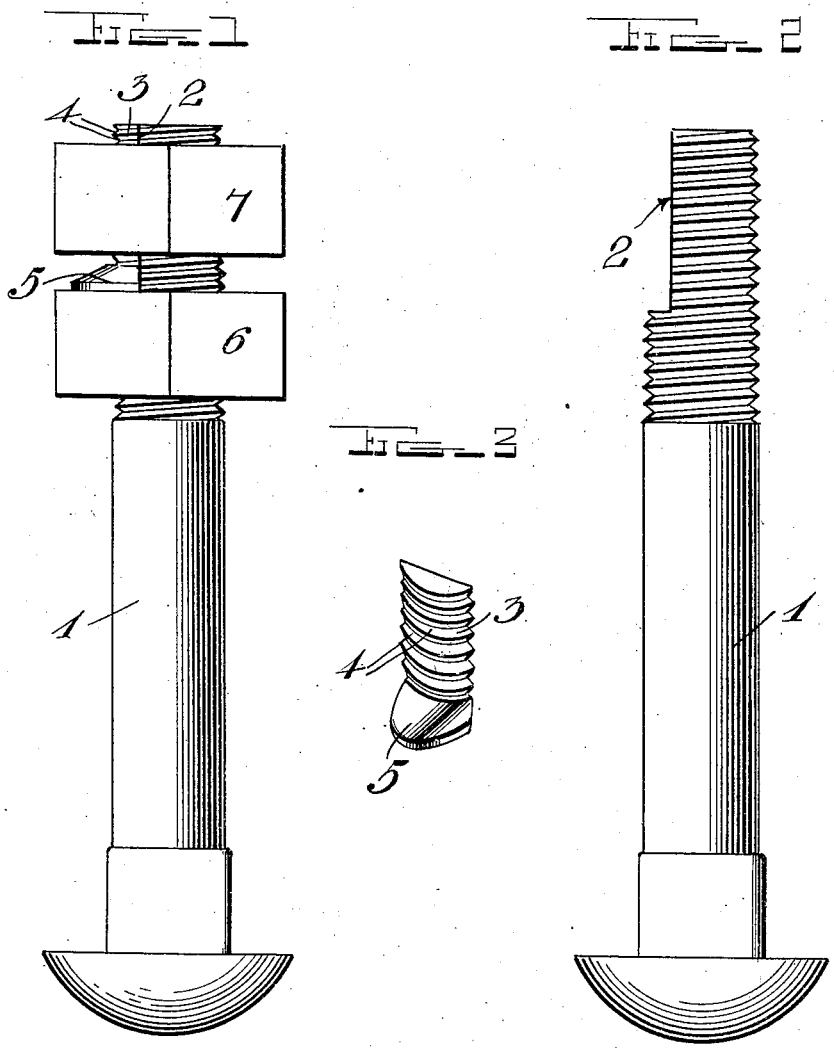

CHARLES H. ROFF, OF MADALIN, NEW YORK.

NUT-LOCK.

938,707.  Specification of Letters Patent.  Patented Nov. 2, 1909.

Application filed December 26, 1908. Serial No. 469,415.

*To all whom it may concern:*

Be it known that I, CHARLES H. ROFF, a citizen of the United States, residing at Madalin, in the county of Dutchess and State of New York, have invented certain new and useful Improvements in Nut-Locks; and I do declare the following to be a full, clear, and exact description of the invention, such as will enable others skilled in the art to which it appertains to make and use the same.

This invention relates to improvements in nut locks.

The object of the invention is to provide a nut lock which will be simple, strong and inexpensive in construction and efficient and reliable in operation.

With these and other objects in view, the invention consists of certain novel features of construction, combination and arrangement of parts, as will be more fully described and particularly pointed out in the appended claim.

In the accompanying drawings, Figure 1 is an elevation of a bolt and nut showing the construction and arrangement of my improved nut lock; Fig. 2 is a side view of the bolt showing the construction of the same to receive the nut lock mechanism; Fig. 3 is a perspective view of the key for holding the fastening nut against movement.

Referring more particularly to the drawings, 1 denotes the bolt which has its threaded end cut away for a portion of its length to provide a flat locking surface 2, with which is adapted to be engaged a locking key 3. The key 3 comprises a body portion which is segmental in shape and provided on its curved side with threads 4. The key is substantially the size and shape of the part of the bolt cut away to form the flat surface 2.

On the inner end of the key 3 is formed an opposite upwardly projecting stop lug 5, which, when the key is in place on the surface 2 of the bolt, is adapted to engage the fastening nut 6 which has been previously screwed on to the bolt and into engagement with the object to which the bolt is applied. The upper surface of the lug 5 is inclined over its outer edge to a point where it merges into the threads on the key so that the locking nut 7 is adapted to ride thereon to tilt the nut upon the bolt and key. This action clamps the parts together and prevents the rotation of the lock nut. After the key has thus been arranged on the flat surface of the bolt with the lug 5 in engagement with the nut 6, a locking nut 7 is screwed on to the threaded end of the bolt and key, thus securely holding the key in place with the lug 5 against the nut 6, thereby holding said nut immovable as long as the locking nut 7 is in engagement with any of the threads of the bolt and key.

A nut lock constructed as herein shown and described will positively hold the fastening nut against movement under all conditions.

The nature of my improved nut lock is such that it may be manufactured at a comparatively small cost.

The parts of the lock may be quickly and easily applied to lock the fastening nut or released to permit the removal of said fastening nut.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described and ascertained the nature of my invention, what I claim as new and desire to secure by Letters-Patent, is—

In a nut lock, a bolt having a portion of its threaded end cut-away or recessed to form a flat locking surface, a key corresponding in shape with the cut-away portion of the bolt and having threads forming a continuation of the threads on the bolt, a laterally projecting stop lug on the inner end of said key adapted to engage the outer sides of the fastening nut on the bolt and having an inclined upper surface merging into the threads on the key, and a locking nut adapted to surround the recessed end of the bolt and said key, whereby the latter is held in operative position, said nut adapted to ride upon the inclined lug upon the key to tilt the nut on the bolt.

In testimony whereof I have hereunto set my hand in presence of two subscribing witnesses.

CHARLES H. ROFF.

Witnesses:
ALFRED E. FEROL,
SYLVESTER TEATOR.